US007149691B2

(12) United States Patent
Balan et al.

(10) Patent No.: US 7,149,691 B2
(45) Date of Patent: Dec. 12, 2006

(54) SYSTEM AND METHOD FOR REMOTELY EXPERIENCING A VIRTUAL ENVIRONMENT

(75) Inventors: Radu Victor Balan, Levittown, PA (US); Dorin Comaniciu, Highland Park, NJ (US); Justinian Rosca, Princeton, NJ (US); Sandra Sudarsky, Bedminster, NJ (US)

(73) Assignee: Siemens Corporate Research, Inc., Princeton, NJ (US)

( * ) Notice: Subject to any disclaimer, the term of this patent is extended or adjusted under 35 U.S.C. 154(b) by 768 days.

(21) Appl. No.: 09/916,918

(22) Filed: Jul. 27, 2001

(65) Prior Publication Data

US 2003/0033150 A1 Feb. 13, 2003

(51) Int. Cl.
*G10L 21/00* (2006.01)
(52) U.S. Cl. ........................ 704/270; 704/275
(58) Field of Classification Search ........... 704/270, 704/275; 381/26, 91–93, 95; 367/56, 57, 367/62
See application file for complete search history.

(56) References Cited

U.S. PATENT DOCUMENTS

| | | | | | |
|---|---|---|---|---|---|
| 4,596,034 | A | * | 6/1986 | Moncrieff | 381/89 |
| 5,572,591 | A | * | 11/1996 | Numazu et al. | 381/1 |
| 5,587,936 | A | * | 12/1996 | Levitt et al. | 703/6 |
| 5,795,228 | A | * | 8/1998 | Trumbull et al. | 463/42 |
| 5,822,230 | A | * | 10/1998 | Kikinis et al. | 708/109 |
| 5,917,944 | A | * | 6/1999 | Wakisaka et al. | 382/190 |
| 6,050,822 | A | * | 4/2000 | Faughn | 434/11 |
| 6,151,027 | A | * | 11/2000 | Yoo | 345/423 |
| 6,219,045 | B1 | * | 4/2001 | Leahy et al. | 715/757 |
| 6,334,103 | B1 | * | 12/2001 | Surace et al. | 704/257 |
| 6,445,798 | B1 | * | 9/2002 | Spikener | 381/63 |
| 6,584,439 | B1 | * | 6/2003 | Geilhufe et al. | 704/270 |
| 6,959,095 | B1 | * | 10/2005 | Bakis et al. | 381/122 |

OTHER PUBLICATIONS

A microphone array system for speech recognition Kiyohara, K.; Kaneda, Y.; Takahashi, S.; Nomura, H.; Kijima, J.; Acoustics, Speech, and Signal Processing, 1997. ICASSP-97., 1997 IEEE International Conference on Vol. 1, Apr. 21-24, 1997 pp. 215-218 vol. 1.*
MacIntyre et al., "Future Multimedia User Interfaces," Multimedia Systems, 1996, pp. 1-25.
Rotstein et al., "Optimal Servoing for Active Foveated Vision," Proceedings of the 1996 Conference on Computer Vision and Pattern Recognition, IEEE, 1996, pp. 177-182.
Murray et al., "Driving Saccade to Pursuit Using Image Motion," pp. 1-26.
Mark Weiser, "The Computer for the 21$^{st}$ Century," Scientific American, Sep. 1991.

* cited by examiner

*Primary Examiner*—Michael N. Opsasnick
(74) *Attorney, Agent, or Firm*—Donald B. Paschburo; F. Chau & Associates, LLC

(57) ABSTRACT

A virtual environment system includes an acoustic localizer for detecting the location of sound sources in a local environment, a user data I/O device, a remote data I/O device in a remote world, and a system controller in data communication with the acoustic localizer, user data I/O device and remote data I/O device. Control of the remote data I/O device within the remote world is commanded by the system controller in response to movements of a user as detected by the acoustic localizer, and data acquired from the remote world by the remote data I/O device is transmitted to the user.

19 Claims, 3 Drawing Sheets

SYSTEM AND METHOD FOR REMOTELY EXPERIENCING A VIRTUAL ENVIRONMENT

FIELD OF THE INVENTION

This invention relates to a system of virtual or artificial reality that permits a user to remotely experience another environment, whether virtual or real. The system may also be adapted to utilize methods of augmented reality.

BACKGROUND OF THE INVENTION

Generally, virtual environments may be divided into two broad categories, virtual reality and artificial reality, each of which may be enhanced with a system of augmented reality.

Virtual reality is a known process of actively stepping inside (to see, hear, act upon) a computer generated, virtual environment. It usually assumes the use of a head-mounted audio/video display, and position and orientation sensors, such as are described in A. Wexelblat (editor), *Virtual reality applications and explorations*, Academic Press, 1993; and B. MacIntyre and S. Feiner, *Future of multimedia user interfaces*, Multimedia Systems, (4): 250–268, 1996.

Artificial reality is a known process of describing virtual environments such that the user's body and actions combine with the computer generated sensory information to forge a single presence. The human perceives his actions in terms of the body's relationship to the simulated world, such as is described in M. Hein, *The metaphysics of virtual reality*, Oxford University Press, 1993, and M. W. Krueger, *Artificial Reality II*, Addison-Wesly Publishing Co., Reading, Mass., 1991.

Augmented reality is a known technology where the user's display shows a superposition of the real world and computer generated graphics (to augment the presentation of the real world objects) by means of a see-through display, such as is described in T. P. Caudell, *Introduction to Augmented Reality*, SPIE Proceedings, vol. 2351: Telemanipulator and Telepresence Technologies, pp. 271–281, Boston, Mass., 1994.

There are a number of known spatial tracking solutions presently used in virtual reality systems, such as are described in MacIntyre et al., supra, and in R. Allison, et al., *First steps with a ridable computer.*, Proceedings of the Virtual Reality 2000 conference, IEEE Computer Society, 18–22 May 2000, pp. 169–175. Mechanical, electromagnetic, ultrasonic, acoustic, and optic (vision-based) systems are known. It is also known to exploit non-visual cues of motion from devices that can be physically moved to generate such cues, such as is described in Caudell, supra. Six-degree-of-freedom sensors are known to provide both position and orientation information in 3-D. Mechanical tracking systems are known that rely on a motion-tracking support structure of high precision, e.g., using opto-mechanical shaft encoders (BOOM 3C from Fakespace Labs). The user is generally anchored to the mechanical device. Electromagnetic systems (e.g., Flock products from Ascension Technology) use DC magnetic fields generated by three mutually orthogonal coils from a stationary transmitter that are detected by a similar three-coils receiver. The audio tracking system produced by Logitech uses three fixed ultrasonic speakers and three mobile microphones, thus detecting all possible 9 distances. Computer vision-based systems use either fixed cameras that track objects with markings (e.g., Northern Digital's Polaris product), or mobile cameras attached to objects that watch how the world moves around (see MacIntyre, supra). Global Positioning System (GPS) based systems receive signals from positioning satellites either directly, or in conjunction with an additional ground-located receiver and transmitter in a precisely known position. Small sized receivers with a small price also make their way into mobile devices (e.g., The Pocket CoPilot from TravRoute).

Many virtual environment applications try to mimic the real world. Thus it would be ideal if user interaction replicated the user's natural way of interacting with the real objects. Almost all VR applications involve some kind of navigation through a virtual 3D environment. Navigation in such environments is a difficult problem: users often get disoriented or lost. A number of three degrees of freedom input devices, including 3D mice, spaceballs, and joysticks have been designed to facilitate user interaction. However, three degrees of freedom are often not sufficient to define user position and orientation in a 3D scenario.

What is needed is a way to localize and receive commands from a user in a virtual environment system without need for the user to have special localizing equipment attached to him nor to input commands into a manual input device, such as a keyboard or mouse.

SUMMARY OF THE INVENTION

Disclosed is a virtual environment system, comprising an acoustic localizer adapted to determine the location of sound sources in a local environment, a user data I/O device, a remote data I/O device in a remote world, a system controller in data communication with said acoustic localizer, user data I/O device, and remote data I/O device, wherein control of said remote data I/O device within said remote world are commanded by said system controller in response to movements of a user as detected by said acoustic localizer, and wherein data acquired from said remote world by said remote data I/O device is transmitted to said user.

In another aspect of the invention, said acoustic localizer comprises a plurality of microphones arrayed in three dimensions.

In another aspect of the invention, at least a portion of said data acquired from said remote world is transmitted to said user through said user data I/O device.

In another aspect of the invention, said user data I/O device comprises a video display and sound input and output systems.

In another aspect of the invention, said user data I/O device is selected from a personal digital assistant, and a tablet computer.

In another aspect of the invention, said video display is augmented with data received from said system controller.

In another aspect of the invention, said system controller is in wireless communication with said user data I/O device.

In another aspect of the invention, said remote data I/O device comprises a robotic camera.

In another aspect of the invention, said robotic camera comprises a remote-controlled camera mounted on a robotic platform.

In another aspect of the invention, said system controller is in wireless communication with said remote data I/O device.

In another aspect of the invention, the orientation of said user is determined by the location of said user in relation to the location of said user data I/O device as detected by said acoustic localizer.

In another aspect of the invention, one or more operations of said remote I/O device within said remote world are commanded by said user through voice commands.

In another aspect of the invention, said system controller comprises an audio signal processing module adapted to control, and process information received from, said acoustic localizer, a speech recognition module adapted to translate voice commands from said user into data commands, a user data I/O device socket server adapted to receive data from said user data I/O device and passing them to other system devices, a media services control server adapted to receive said user commands from said user data I/O device socket server and adapted to manage the flow of data to said data user I/O device from said remote data I/O device, a remote data I/O device control module adapted to receive commands from said speech recognition module and from said media services control server and process said commands to control said remote data I/O device, and a media encoder/streamer adapted to stream data to said data user I/O device from said remote data I/O device under the control of said media services control server.

Disclosed is a virtual environment system, comprising acoustic localizing means for determining the location of sound sources in a local environment, user data I/O means for receiving data from and/or transmitting data to a user, remote data I/O means, disposed in a remote world, for receiving data from and/or transmitting data to said remote world, system controller means for controlling data flow among, and in data communication with, said acoustic localizing means, user data I/O means, and remote data I/O means, wherein control of said remote data I/O device within said remote world is commanded by said system controller in response to movements of a user as detected by said acoustic localizer, and wherein data acquired from said remote world by said remote data I/O device is transmitted to said user through said user data I/O device.

Disclosed is a method of remotely experiencing a remote world from a local environment, comprising providing a remote data I/O device in the remote world, providing an acoustic localizer in the local environment, said acoustic localizer adapted to detect the position of sound sources, providing a user data I/O device in the local environment, providing a system controller in data communication with said remote data I/O device, acoustic localizer, and user data I/O device, wherein said system controller is adapted to control said remote data I/O device in response to data received from said local environment.

In another aspect of the method, said remote data I/O device in said remote world is controlled by at least one of the detected position of a user in said local environment, voice commands from said user, and the orientation of said user.

In another aspect of the method, the spatial positioning of said remote data I/O device in said remote world is controlled by the detected position of said user in said local environment.

In another aspect of the method, data acquired from said remote world is transmitted to said user.

In another aspect of the method, at least a portion of said data acquired from said remote world is transmitted to said user through said user data I/O device.

DETAILED DESCRIPTION OF PREFERRED EMBODIMENTS

Figure 1:
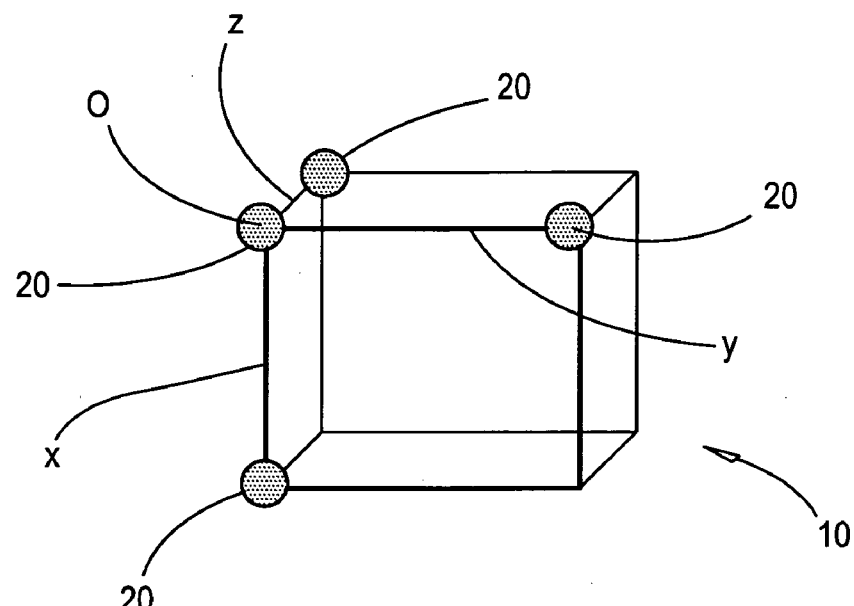
FIG. 1 is a diagram of an embodiment of a three-dimensional microphone array and coordinate system.

Described herein is a system that uses acoustics to both locate, determine the orientation of, and receive commands from the user. Visual output to the user will preferably come in the form of a conveniently carried user data I/O device with visual display and sound input and output systems, such as a personal digital assistant (PDA) or the like. The system may be used to interact with the user to enable him to move about in a remote world, which may be a virtual reality, or a true reality in which a robotic camera moves about in response to the user's movements and commands, a so called artificial reality. The system will operate entirely, or almost entirely on voice commands from the user, which will also be used to locate the user's position and orientation. Hence, the acoustically driven system is, in effect, an "acoustic periscope" by which the user may peek into and see around the remote world.

Localization

To understand how an acoustic localizer would work, consider that two microphones are sufficient to estimate the direction of arrival of a signal in one plane. Assume the following signal model in an anechoic environment, usually a room with shaped foam rubber on the walls:

$$x_1(t)=a_1 s(t-\tau_1)+v_1(t) \tag{1a}$$

$$x_2(t)=a_2 s(t-\tau_2)+v_2(t) \tag{1b}$$

where s(t) is the source signal, $x_1(t)$ and $x_2(t)$ are two microphone signals recording an attenuated source by amplitude factors $a_1$ and $a_2$, τ is a delay offset, and $v_1$, $v_2$ are mutually independent noises, also independent of the source signal.

Let $\tau=\tau_1-\tau_2$ and assume it to be a multiple of a sampling period $$T_s = \frac{1}{f_s},$$

where $f_s$ is the sampling frequency. Note that the cross-covariance between $x_1(\cdot)$ and $x_2(\cdot-\delta)$ for a delay δ is:

$$R(\delta)=E[x_1(\cdot)x_2(\cdot-\delta)]=E[s(\cdot)s(\cdot-(\delta-\tau))]\leq R(\tau) \tag{2}$$

where E[ ] denotes the expected value. Therefore, one simple method of estimating the direction of arrival is based on the computation of the cross-covariance between the two microphone signals:

$$\hat{\tau}=\arg\max_\delta\{E[x_1(\cdot)x_2(\cdot-\delta)]\} \tag{3}$$

In implementation, the expected value would be derived by time averaging over a batch of samples, thereby smoothing it out.

In 3-D, the geometric locus of points that induce a constant delay difference to two microphones (i.e., have constant difference in distances to two microphones) is a hyperbolic surface. To reduce non-determination to a point (or a small physical volume around that point if estimation tolerance is introduced), we need to intersect three such surfaces obtained from three pairs of two microphones each. Therefore, four microphones will be used in order to unambiguously estimate the source location in three dimensions. The relative delays in the arrival of sound to the microphones that is induced by the position of a sound source determines a system of equations, well known in the art, the solution of which yields the coordinates of the sound source.

How the four microphones needed for 3-D localization are placed will affect the accuracy of the system. The accuracy is derived as follows:

Given the speed c of sound propagation and the distance between two microphones d, the maximum delay inducible in the microphone signals, in samples, is:

$$\tau_{max} = \frac{df_s}{c} \qquad (4)$$

The cross-covariance solution above only deals with integer delays, so that the best angular resolution of the method is:

$$\Delta\alpha = \frac{180}{2\tau_{max} + 1} \qquad (5)$$

For a distance between microphones d=3 m and a sampling frequency $f_s$=16 kHz, we obtain $\Delta\alpha$=0.6 deg. This corresponds to an error in estimating the source position (in a plane) of about 0.7 cm. This implicitly considers that the source moves on a circle centered at the midpoint between microphones. Unfortunately, the resolution is nonlinear around the microphones. It is worse if the source has moved away from the two microphones, for example, by sliding away on the median of the two microphones. Nonetheless, more microphone pairs are there to help, and the precision estimation analysis tells us how to place microphones in the environment.

Referring to FIG. 1, there is shown a preferred placement of four microphones 20 (one of which also serves as the coordinate origin O), such that the three pairs to be considered span the three coordinate axis (Ox, Oy, Oz) such as to form a microphone array, or system 10. A refined computation of resolution in the 3-D case may be estimated by assuming that the audio source to be localized in 3-D is estimated to be placed at P(x,y,z), whose distances to the microphones 20 are $d_k$, k=1, . . . , 4. Further assume that the true source position is $P_0(x_0,y_0,z_0)$, with distances $d_k^0$, k=1, . . . , 4 to the microphones 20. To estimate the accuracy of localization, the size of the geometric locus of points P(x,y,z) where the estimated source could be placed must be determined. The geometric locus of points is defined as follows:

$$|(d_k-d_j)-(d_k^0-d_j^0)|<c\tau, \forall k\neq j; k, j=1, \ldots, 4 \qquad (6)$$

Consider the case of a room of dimensions 5×4×3 meters, and the four microphones 20 placed in three corners of the rooms forming a tetrahedral microphone system 10 as in FIG. 1. The above analysis yields the worst-case error in one direction given by the largest distance D to the closest distance d to a microphone pair $$\underset{i,j}{\mathrm{argmin}}\{d_{ij}\}.$$

As an example, the largest error along the x-axis corresponding to an error of one sample in delay estimation is given by:

$$\Delta x = 2\sqrt{\frac{2}{\alpha-1} \cdot D^2 - \frac{2\beta}{\alpha+1}}, \alpha = \frac{8d^2 f_s^2}{c^2} - 1, \beta = -\frac{d^2}{4} \qquad (7)$$

For c=320 m/s, d=3 m, D=5 m, and $f_s$=16 kHz the above formula calculates an error $\Delta x \approx 0.035$ m.

In the worst case the localization error is approximately several centimeters for a 5×4×3 meter room, which reveals that the acoustic localization method is perfectly suitable for the purposes of the invention.

If the original signal to be "spoken" in the environment is known in advance (e.g., this is generally the case for the utterances of the user data I/O device 105), then the induced delays can be calculated much more precisely by reference to the original signal. This means that localization accuracy is equally increased.

Orientation

Figure 2:
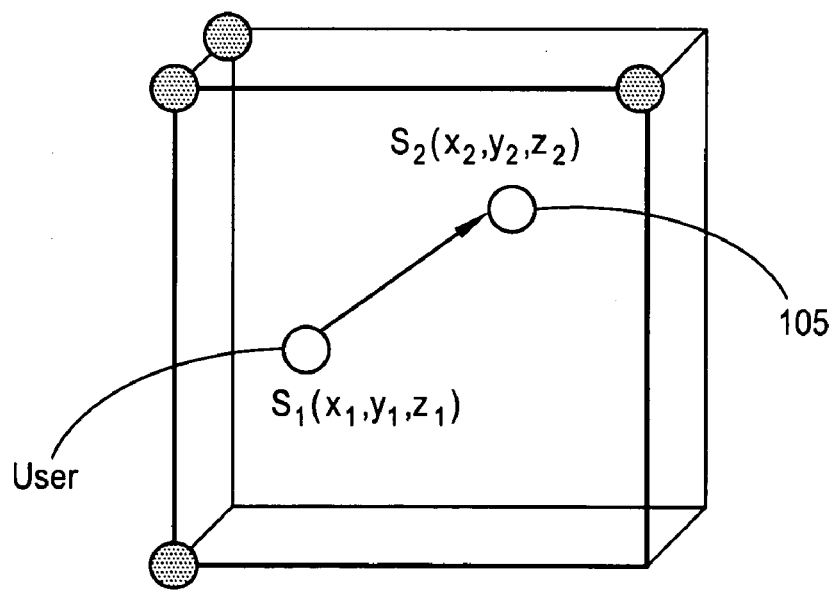
FIG. 2 is a diagram of a user's and user data I/O device's position in the coordinate system of FIG. 1.

Referring to FIG. 2, orientation estimation relies on the estimation in position of both the user's head and the user data I/O device 105. We assume that the user would talk after each move in her physical space, thereby revealing her position, and that the user data I/O device 105 would respond by emitting a frequency rich signal (e.g., a speech reply), thereby revealing its position.

The user would normally hold the user data I/O device 105 in front of herself, at a distance of about a half meter. The two source positions thereby give a reasonable estimate of the orientation of the user. There are a number of ways to distinguish the user voice from the user data I/O device, such as by having the user data I/O device emit a code sequence, or by including one or more frequencies in the user data I/O device voice not normally found in human speech, or by the "voice signature" of the user data I/O device voice as determined by, for example, fast Fourier transform or cepstral vector analysis as is known in the art of speech identification. A simple way is to have the user data I/O device respond to each command in words that the user wouldn't normally use, such as "Yes, sir!" or "Executing . . . ", though in this case the user could trick the system by uttering the same words. Source localization also may be used to distinguish between the sources, among other methods.

System Components

Figure 3:
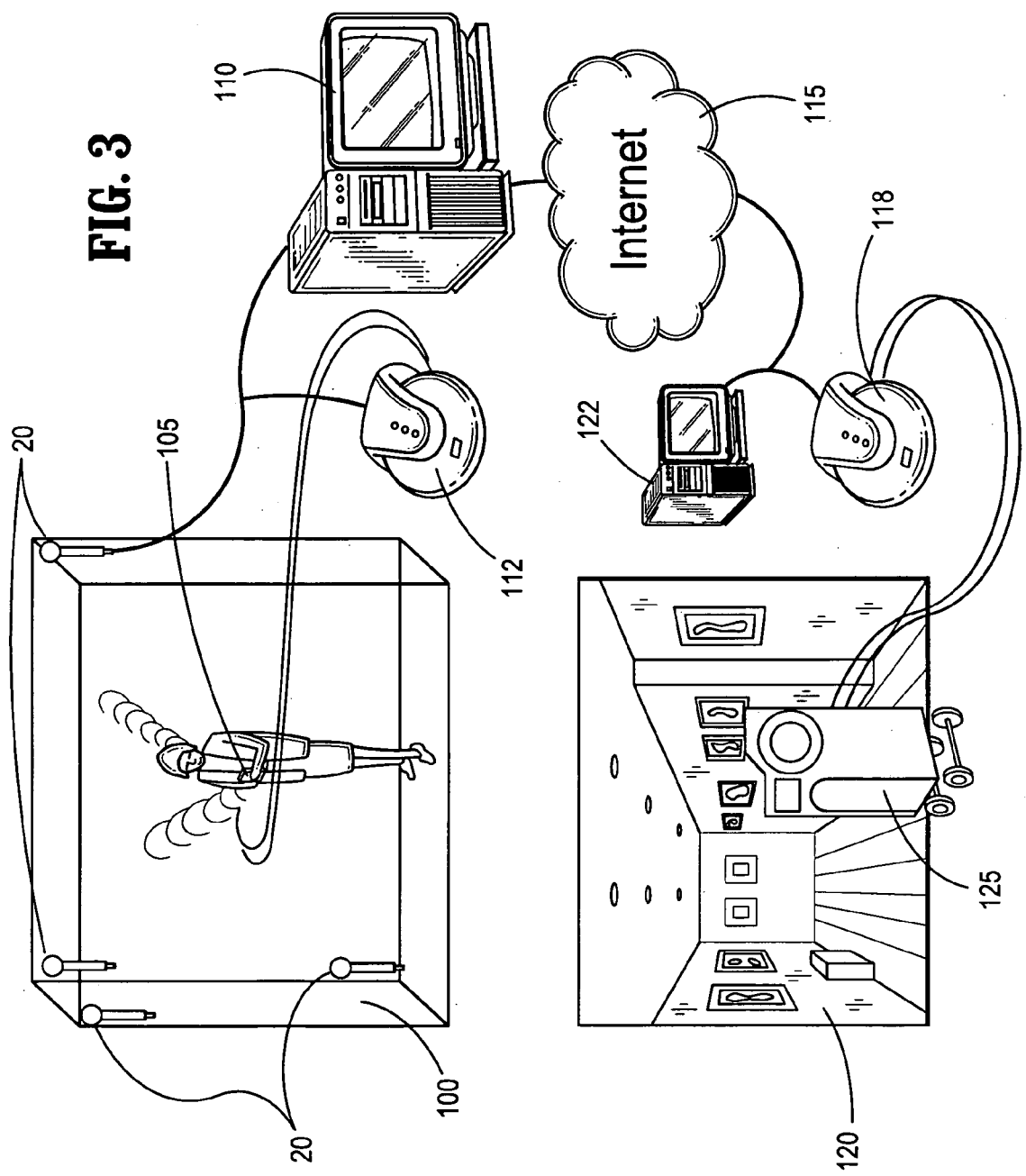
FIG. 3 is a diagram of an embodiment of the overall system design of the invention.

Referring to FIG. 3, the overall system design is shown. The system comprises three main system components, namely the user's environment 100, the host server 110, and the remote world 120, which is here depicted as a real world location in which a robotic remote data I/O device 125, such as a camera mounted on a robotic platform, is placed. Alternatively, the remote world 120 can be a purely virtual world provided by software running on a computer, even the host server 110 itself, or a remote server 122, in which case the remote data I/O device 125 is itself virtual.

The host server may be any suitable server, such as a Windows 2000 Pentium-based personal computer, which may be configured as a media server as well.

Figure 3B:
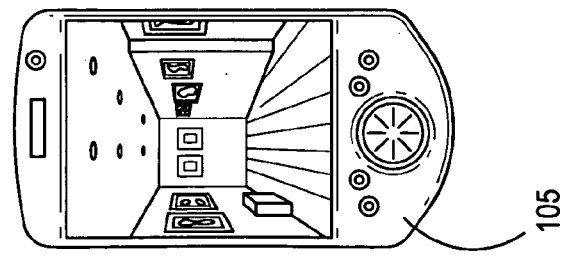

The user's environment 100 comprises a plurality of microphones 20, preferably at least four for 3-D applications, and a user data I/O device 105, such as a PDA or tablet computer or the like, (shown close-up in FIG. 3b) adapted to receive voice commands from the user, emit sounds to enable the microphones 20 to localize it, optionally emit sounds to communicate information to the user, and display to the user information retrieved from the remote world 120. The user data I/O device may also receive touch commands from the user through buttons thereon.

The microphone system 10 is preferably implemented with a data acquisition board (not shown), that amplifies the audio signals and converts them into digital format, and that may be plugged into the host server 120, such as that sold under the Signalogic tradename as the model M44 Flexible DSP/Data Acquisition Board, which is equipped with a four-channel, 96 kHz maximum sampling frequency, 24-bit sigma-delta analog I/O. Into each channel a microphone is plugged, such as a four-condenser phantom-powered microphones, known for their sensitivity to distant signals.

The host server 110 comprises machine executable code tangibly embodied in a program storage device and a machine for executing the code. The host server 110 receives data from the microphones 20 and both receives and transmits data to and from the user data I/O device 105. The host server also receives and transmits data to and from the remote world (or virtual world), which may be via a direct link to the remote data I/O device 125 or through a remote server 122. The connection with the remote world 120 may be through the Internet 115 as shown, or other network or direct hookup. Preferably, the user data I/O device 105 will be a handheld device that may communicate wirelessly with the host server through a local receiver/transmitter 112. Likewise, the I/O device 125 will also communicate wirelessly with a remote receiver/transmitter 118.

Both the host and remote servers will preferably run a local and remote wireless local area network (WLAN), respectively, that has sufficient throughput to handle the traffic. Generally, the hub will be 802.11b compliant. A good user data I/O device 105 in such a configuration is the iPAQ series of personal digital assistants sold by Compaq Computer Corp., such as the iPAQ 3600 PDA, which may be equipped with a WLAN card. Combined with a SONY EVI-D30 camera as the remote camera, a WLAN throughput of about 10 Mb/sec should be more than sufficient. The camera will then be mounted on a robotic platform, such as the Pioneer 2-CE mobile robot manufactured by ActivMedia Robotics, LLC of Peterborough, N.H.

Software Architecture

Figure 4:
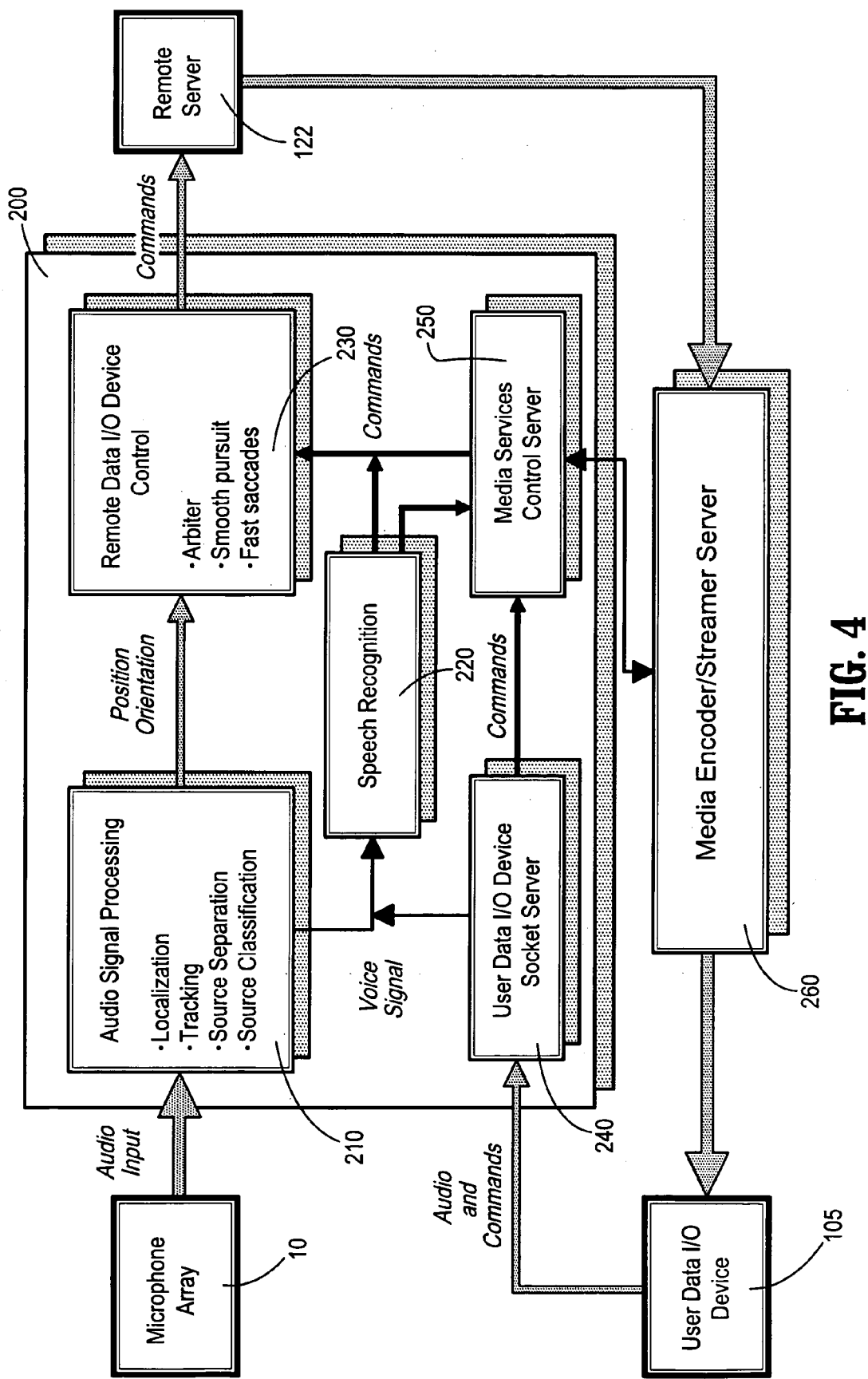
FIG. 4 is a schematic of an embodiment of the software architecture of the invention.

Referring to FIG. 4, there is shown a schematic of a preferred embodiment of the software architecture of the invention. In a preferred embodiment, the main system components on the server side are assembled a system controller 200, preferably comprising a multithreaded real-time application controlling the audio acquisition system, the remote video system (or the virtual "camera" in a virtual world) and the video-streaming component. An audio signal processing module 210 is itself multithreaded and is responsible for controlling the microphone system 10 in real-time, preferably by controlling a data acquisition board, and is adapted to process the audio data received from the microphones to localize sources and determine the orientation of the user, and will preferably also perform noise reduction and blind source separation in order to pass clean audio signals to a signal matching component and to the speech recognition module 220. In such a case, the software architecture is a part of the acoustic localizer. Alternatively, the acoustic localizer may be implemented in hardware and thereby exist entirely outside the software architecture, if desired.

The audio signal processing module 210 audio signal processing module will also preferably have a source separation component to extract the user and user data I/O device 105 sound signals in cases where the user and the device emit sounds simultaneously. The module may also implement location estimation in order to rack the locations of the user and the user data I/O device. If the system controls the sounds emitted by the user data I/O device 105 then it is a simple matter to locate it and to deduce that a sound emitted from a different location must be the user.

A speech recognition module 220 is responsible for parsing and understanding human free speech according to an application-dependent command interaction language and translate them into machine-readable commands. The commands are then passed on to a remote data I/O device control module 230. The remote data I/O device control module 230 is responsible for controlling the robotic remote, such as the pan and tilt of a camera and the movements of a robotic platform. To insure a smooth visualization, the camera will preferably execute fast saccades in response to sudden and large movements of the user while providing a smooth pursuit when the user is quasi-stationary, such as is described in detail in D. W. Murray et al., *Driving Saccade to Pursuit using Image Motion*, Int. J. Comp. Vis., 16(3), pp. 204–228, 1995; and H. P. Rotstein and E. Rivlin, *Optimal Servoing for Active Foveated Vision*, IEEE Conf. Comp. Vis. Pat. Rec., San Francisco, pp. 177–182, 1996; the disclosures of both of which are incorporated by reference herein in their entirety. An arbiter additionally takes into account commands extracted by speech recognition and implements the overall control, preferably in a manner that resembles human movement. A fovea subimage region is preferably defined within which the target object are tracked smoothly. If the target exits the foveate region, tracking jumps, or saccades, to catch the moving target. The fovea subimage will generally occupy laterally about 6 deg. per 50 deg. of camera field of view, at zero zoom.

A user data I/O device socket server module 240 is responsible for receiving commands and voice data from the user data I/O device 105 and passing them to the other system components. In noisy conditions, it may be preferable to interpret the user data I/O device audio signal for subsequent speech recognition, rather than the signal obtained after processing microphone sensor data.

A media services control server 250 is adapted to send the user's spoken commands received from the socket server module 240 via the speech recognition module 220 to the camera control module 230. It is also adapted to receive non-verbal commands directly from the socket server 240, which would usually correspond to button or other non-verbal commands entered by the user into the user data I/O device 105. The media services control server 250 also manages a media encoder/streamer server 260. It also arbitrates the various commands extracted from speech or from the user data I/O device 105.

The media encoder/streamer server 260 is adapted to open and close sessions with the remote server 122 and to stream data from the remote data I/O device (125 in FIG. 3) to the user data I/O device 105.

Operation

The operation of the system may vary according to how the system is programmed, but generally, the user will stand in a room having the microphone array while holding the user data I/O device in his hand. If he rotates to the left or right, the remote camera rotates to the left or right. If he moves laterally, the remote camera moves laterally. The rotational and lateral movements may be relative to the room or relative to the user, preferably at the option of the user by control buttons on the user I/O device or by speech commands. Speech commands or buttons may also be used to control up and down movement of the device to determine whether the remote camera will tilt up and down or actually rise and fall vertically. Generally, it is preferable to favor speech commands over manual input so as to enhance the sensation of being in the virtual or artificial reality. Information regarding the remote world and the program settings may be superimposed over the image the user sees on his user data I/O device as an augmented reality.

Sound in the remote world may be broadcast to the user through the user data I/O device or, if better quality sound is desired, through one or more speakers placed within the room. In the latter case, it will be necessary to program the system to distinguish between the wall speakers and the user or user data I/O device.

Certainly amongst the most natural ways of navigation is navigation by moving in the physical world without carrying any cumbersome tracking devices. An advantageous feature of the invention is the creation of a natural (intuitive), and transparent (effortless) interaction of the user with the remote, virtual world. The invention has many applications.

Among the applications of the invention are interactive walkthroughs applications, such as those described in M. Weiser, *The Computer for the 21st Century*, Scientific American, September 1991, the disclosures of which are incorporated by reference herein in their entirety. Such applications let the user experience a virtual world by moving through and around virtual objects. In the invention, the user location and orientation can be tracked by means of a set of microphones and this information is then used to update the position of the virtual camera. With this type of interaction, the user may, for example, walk through the interior of a virtual building to evaluate the architectural design in a natural way, just by walking around a room with only a PDA in his/her hand. Because the user can usually move only on the floor, the orientation information may be used to provide the user more degrees of freedom, for example to move up and down staircases by raising or lowering the device. In addition, with a simple speech command, the user could, for example, make the walls transparent to further evaluate plumbing and wiring.

Another interesting application where natural user interaction is desirable is the use of large wall display systems for business presentations, and immersive, collaborative work, such as that described in Kai Li, Han Chen, et al., *Early Experiences and challenges in Building and using a scalable display wall system*, IEEE Computer graphics and applications, vol. 20(4), pp. 671–680, the disclosures of which are incorporated by reference herein in their entirety, wherein there is presented the construction of a scalable display where multiple cameras are used to track the user, recognize her gestures and detect the location of some novel input devices. In contrast, the invention uses audio to track the user position and orientation and also recognize spoken commands. The invention can be programmed so that the user can zoom in and out by moving closer and further away from the display, several users can have control over the display without sharing any input devices, and speech recognition can be used to control the speed and other aspects of the presentation.

As can be seen, the invention exploits an often neglected but very rich modality of our environment, namely sound. This invention discloses the "acoustic periscope" metaphor as described in Applicants' publication, J. Rosca et al., *Mobile Interaction with Remote Worlds: The Acoustic Periscope*, IJCAI [citation to be inserted after publication] (2001), the disclosures of which are incorporated by reference herein in their entirety, and an implementation approach that utilizes commercially available hardware at reasonable cost.

The invention, depending upon implementation may have any combination of advantages, including Presenting virtual/remote sensations to the user by means of none of the normally used virtual reality I/O devices, but rather with a much more simply to installed and utilized system of microphones.

Audio source location estimation, localization, and orientation come for free, being entirely transparent to the other functions of the system, just from picking up the speech commands of the user and the sound output of the user data I/O device.

A natural, intuitive, and transparent interaction with a remote, virtual world. Moving around achieves navigation as in other VR systems, but without carrying any cumbersome tracking devices.

Audio signals from the human user (speech) and the user data I/O device (speech generated replies or special signals) are sufficient for determining source location and orientation of the user with sufficient precision (several centimeters for localization), at least for some applications. The acoustic model used in our formal derivations here is anechoic.

The overall system philosophy and architecture allows a natural integration of virtual reality interaction and speech processing for transcending computers to a ubiquitous stage, wherein the focus is on one's actions and activities rather than the actual mode of interaction.

It is to be understood that all physical quantities disclosed herein, unless explicitly indicated otherwise, are not to be construed as exactly equal to the quantity disclosed, but rather as about equal to the quantity disclosed. Further, the mere absence of a qualifier such as "about" or the like, is not to be construed as an explicit indication that any such disclosed physical quantity is an exact quantity, irrespective of whether such qualifiers are used with respect to any other physical quantities disclosed herein.

While preferred embodiments have been shown and described, various modifications and substitutions may be made thereto without departing from the spirit and scope of the invention. Accordingly, it is to be understood that the present invention has been described by way of illustration only, and such illustrations and embodiments as have been disclosed herein are not to be construed as limiting to the claims.

What is claimed is:

1. A virtual environment system, comprising:
an acoustic localizer adapted to determine the location of sound sources in a local environment, said acoustic localizer comprising a plurality of microphones arrayed to span the three coordinate axes of a three dimensional space, wherein for each pair of microphones along each coordinate axis, wherein there is a delay difference δ between an arrival time of a sound signal at each microphone of said pair, said sound source location is estimated by forming a surface for each said microphone pair comprising a locus of points that induce said delay difference in said pair of microphones and forming an interception of each surface for each said axis pair to estimate a location of said sound source, wherein an error Δ in one direction for said source location is given by $$\Delta = 2\sqrt{\frac{2D^2}{\alpha-1} - \frac{2\beta}{\alpha+1}};$$

wherein $$\alpha = \frac{8d^2 f^2}{c^2} - 1, \quad \beta = -\frac{d^2}{4},$$

wherein D is a largest distance a microphone pair and said sound source location as projected along said one direction, d is a closest distance between microphone pairs, f is a sampling frequency, and c is a speed of propagation for said sound signal.

2. The system of claim 1, further comprising:
a user data I/O device;
a remote data I/O device in a remote world;
a system controller in data communication with said acoustic localizer, user data I/O device, and remote data I/O device;
wherein control of said remote data I/O device within said remote world are commanded by said system controller in response to movements of a user as detected by said acoustic localizer; and
wherein data acquired from said remote world by said remote data I/O device is transmitted to said user.

3. The system of claim 2 wherein at least a portion of said data acquired from said remote world is transmitted to said user through said user data I/O device.

4. The system of claim 2 wherein said system controller is in wireless communication with said user data I/O device.

5. The system of claim 2 wherein said system controller is in wireless communication with said remote data I/O device.

6. The system of claim 2 wherein the orientation of said user is determined by the location of said user in relation to the location of said user data I/O device as detected by said acoustic localizer.

7. The system of claim 2 wherein one or more operations of said remote I/O device within said remote world are commanded by said user through voice commands.

8. The system of claim 2 wherein said system controller comprises:
an audio signal processing module adapted to control, and process information received from, said acoustic localizer;
a speech recognition module adapted to translate voice commands from said user into data commands;
a user data I/O device socket server adapted to receive data from said user data I/O device and passing them to other system devices;
a media services control server adapted to receive said user commands from said user data I/O device socket server and adapted to manage the flow of data to said data user I/O device from said remote data I/O device;
a remote data I/O device control module adapted to receive commands from said speech recognition module and from said media services control server and process said commands to control said remote data I/O device; and
a media encoder/streamer adapted to stream data to said data user I/O device from said remote data I/O device under the control of said media services control server.

9. The system of claim 2 wherein said remote data I/O device comprises a robotic camera.

10. The system of claim 9 wherein said robotic camera comprises a remote-controlled camera mounted on a robotic platform.

11. The system of claim 2 wherein said user data I/O device comprises a video display and sound input and output systems.

12. The system of claim 11 wherein said user data I/O device is a personal digital assistant.

13. The system of claim 11 wherein said video display is augmented with data received from said system controller.

14. A method of remotely experiencing a remote world from a local environment, comprising:
providing an acoustic localizer in the local environment, said acoustic localizer adapted to detect the position of sound sources, said acoustic localizer comprising a plurality of microphones arrayed to span the three coordinate axes of a three dimensional space, wherein for each pair of microphones along each coordinate axis, wherein there is a delay difference $\delta$ between an arrival time of a sound signal at each microphone of said pair; and
estimating said sound source location by forming a surface for each said microphone pair comprising a locus of points that induce said delay difference in said pair of microphones and forming an interception of each surface for each said axis pair to estimate a location of said sound source, wherein an error $\Delta$ in one direction for said source location is given by $$\Delta = 2\sqrt{\frac{2D^2}{\alpha - 1} - \frac{2\beta}{\alpha + 1}};$$

wherein $$\alpha = \frac{8d^2 f^2}{c^2} - 1, \quad \beta = -\frac{d^2}{4},$$

wherein D is a largest distance a microphone pair and said sound source location as projected along said one direction, d is a closest distance between microphone pairs, f is a sampling frequency, and c is a speed of propagation for said sound signal.

15. The method of claim 14, further comprising:
providing a remote data I/O device in the remote world;
providing a user data I/O device in the local environment;
providing a system controller in data communication with said remote data I/O device, acoustic localizer, and user data I/O device;
wherein said system controller is adapted to control said remote data I/O device in response to data received from said local environment.

16. The method of claim 15 wherein said remote data I/O device in said remote world is controlled by at least one of:
the detected position of a user in said local environment;
voice commands from said user; and
the orientation of said user.

17. The method of claim 15 wherein the spatial positioning of said remote data I/O device in said remote world is controlled by the detected position of said user in said local environment.

18. The method of claim 15 wherein data acquired from said remote world is transmitted to said user.

19. The method of claim 18 wherein at least a portion of said data acquired from said remote world is transmitted to said user through said user data I/O device.

* * * * *